UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 811,471.  Specification of Letters Patent.  Patented Jan. 30, 1906.

Application filed October 10, 1905. Serial No. 282,185.

*To all whom it may concern:*

Be it known that we, OSCAR BALLY, a citizen of the Swiss Republic, residing at Mannheim, in the Grand Duchy of Baden, and HUGO WOLFF, a subject of the Grand Duke of Baden, residing at Ludwigshafen-on-the-Rhine, in the Kingdom of Bavaria, German Empire, doctors of philosophy and chemists, have invented new and useful Improvements in Anthracene Dye and Processes of Making Same, of which the following is a specification.

New compounds of the anthracene series containing a benzanthrone group can be obtained by condensing certain anthracene compounds with glycerin. (See Letters Patents Nos. 786,085, 787,859, and 798,104.) It has been discovered that these new benzanthrones upon being treated with caustic alkali yield valuable coloring-matters possessing dyeing properties similar to those of indanthrene, and this invention has been described in an application for a patent filed on January 31, 1905, Serial No. 243,571, which contains generic claims for coloring-matters, which can be produced by treating a benzanthrone with caustic alkali and also for the process for producing the same.

In the present application we make no generic claim for the production of coloring-matters from benzanthrones and for the coloring-matters themselves; but we wish to claim specifically the coloring-matters obtainable by treating with caustic alkali a benzanthrone which can be obtained by condensing with glycerin an alpha-amidoanthraquinone body, as described in the specification of the application for Letters Patent, Serial No. 282,184, dated October 10, 1905, and the process for producing these coloring-matters. They are soluble in concentrated sulfuric acid giving olive-green solutions, and they dissolve in alkaline hydrosulfite yielding blue to violet vats, which dye vegetable fiber substantively giving bluish shades. In particular the coloring-matter obtainable from alpha-amidoanthraquinone yields a blue vat with alkaline hydrosulfite.

The following example will serve to further illustrate the nature of our invention, which, however, is not confined to this example. The parts are by weight. Purify by extracting by means of hot dilute acid and then precipitating by means of alkali the condensation product obtainable by heating alpha-amidoanthraquinone with glycerin and sulfuric acid and introduce ten (10) parts of the purified product (which we term "alpha-benzanthrone-quinolin") while stirring into a mixture of fifty (50) parts of caustic potash and forty (40) parts of absolute alcohol at a temperature of one hundred and sixty (160°) degrees centigrade. Continue stirring and raise the temperature gradually to from two hundred and twenty (220°) to two hundred and thirty (230°) degrees centigrade and continue heating until a test portion shows that no unaltered alpha-benzanthrone-quinolin is present. Allow the melt to cool to about eighty (80°) degrees centigrade, pour into water, boil, and filter. In order to purify the black residue, boil it first with a solution of sodium hypochlorite and then with dilute acid and filter and wash. If it be desired to still further purify the coloring-matter, it can be dissolved in caustic soda and hydrosulfite solution, filtered while hot, and precipitated from the hot filtrate by passing air through it.

The coloring-matter so obtained is a blackish violet paste and when dry is a violet-black powder which is insoluble in hot water and in dilute caustic-soda solution. It dissolves in concentrated sulfuric acid, yielding a dirty olive-green solution, and in twenty-three (23) per cent. oleum forming a green solution. It is also soluble in nitrobenzene and in quinolin, the solution being green. Upon warming with caustic soda and hydrosulfite it yields a blue-violet vat which dyes vegetable fiber blue shades of excellent fastness.

Now what we claim is—

1. The process for the production of anthracene coloring-matters by treating with caustic alkali a hereinbefore-defined benzanthrone compound obtainable by condensing together an alpha-amidoanthraquinone body and glycerin.

2. The process for the production of anthracene coloring-matter by treating with caustic alkali a hereinbefore-defined benzanthrone compound obtainable by condensing together alpha-amidoanthraquinone and glycerin.

3. As new articles of manufacture, the anthracene coloring-matters which can be obtained by treating with caustic alkali a benzanthrone obtainable from an alpha-amidoanthraquinone body, which coloring-matters dissolve in concentrated sulfuric acid yielding olive-green solutions, and which dissolve in alkaline hydrosulfite yielding blue to violet vats which dye vegetable fiber substantively giving bluish shades.

4. As a new article of manufacture the anthracene coloring-matter which can be obtained by treating with caustic alkali the benzanthrone obtainable from alpha-amidoanthraquinone, which coloring-matter dissolves in concentrated sulfuric acid yielding an olive-green solution, and which dissolves in alkaline hydrosulfite yielding a blue-violet vat which dyes vegetable fiber substantively yielding blue shades.

In testimony whereof we have hereunto set our hands in the presence of two subscribing witnesses.

OSCAR BALLY.
HUGO WOLFF.

Witnesses:
ERNEST F. EHRHARDT
J. ALEC. LLOYD.